(12) United States Patent
Cavalieri et al.

(10) Patent No.: US 8,703,262 B2
(45) Date of Patent: Apr. 22, 2014

(54) POLYOLEFIN AND COMPOSITION FOR PIPE SYSTEMS AND SHEETS

(75) Inventors: Claudio Cavalieri, Ferrara (IT); Monica Galvan, S. Maria Maddalena (IT); Francesca Tisi, S. Maria Maddalena (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/805,766

(22) PCT Filed: Jun. 8, 2011

(86) PCT No.: PCT/EP2011/059424
§ 371 (c)(1),
(2), (4) Date: Dec. 20, 2012

(87) PCT Pub. No.: WO2011/160946
PCT Pub. Date: Dec. 29, 2011

(65) Prior Publication Data
US 2013/0095267 A1 Apr. 18, 2013

Related U.S. Application Data

(60) Provisional application No. 61/398,366, filed on Jun. 24, 2010.

(30) Foreign Application Priority Data

Jun. 23, 2010 (EP) .................................. 10167048

(51) Int. Cl.
*B29D 22/00* (2006.01)
*B29D 23/00* (2006.01)
*B32B 1/08* (2006.01)

(52) U.S. Cl.
USPC .................... 428/36.9; 428/36.91; 428/36.92; 428/35.7; 428/500; 525/240; 138/140

(58) Field of Classification Search
USPC ................. 428/36.9, 36.91, 36.92, 500, 35.7; 525/240; 138/140
See application file for complete search history.

(56) References Cited

U.S. PATENT DOCUMENTS 4,399,054 A 8/1983 Ferraris et al.

FOREIGN PATENT DOCUMENTS

| EP | 045977 | 2/1982 |
|---|---|---|
| EP | 361493 | 4/1990 |
| EP | 0395083 | 10/1990 |
| EP | 0728769 | 8/1996 |
| EP | 0782587 | 7/1997 |
| EP | 2022824 | 2/2009 |
| WO | WO-0063261 | 10/2000 |
| WO | WO-03037981 | 5/2003 |
| WO | WO-2005014713 | 2/2005 |
| WO | WO-2005040271 | 5/2005 |
| WO | WO-2006/002778 | 1/2006 |
| WO | WO-2006114358 | 11/2006 |
| WO | WO-2008077773 | 7/2008 |
| WO | WO-2010072841 | 7/2010 |
| WO | WO-2011160945 | 12/2011 |
| WO | WO-2011160953 | 12/2011 |

*Primary Examiner* — Michael C Miggins

(57) ABSTRACT

A polyolefin composition for pipes comprising (percent by weight):
- A) from 1% to 9.5%; of a copolymer of propylene and hexene-1 wherein said copolymer comprises from 0.1 to 5% of recurring units derived from hexene-1;
- B) from 80.5% to 99% of a heterophasic polypropylene composition comprising:
- B1) from 50% to 85% of a propylene homopolymer, said propylene polymer being insoluble in xylene at ambient temperature in an amount over 85% having a polydispersity Index ranging from 3 to 10; and a Melt Index from 0.5 to 10 dg/min;
- B2) from 5% to 50% of a copolymer of ethylene and propylene having an ethylene derived units content ranging from 30% to 70%;
said polymeric composition having a Melt Index from 0.05 to 10 dg/min.

7 Claims, No Drawings

POLYOLEFIN AND COMPOSITION FOR PIPE SYSTEMS AND SHEETS

This application is the U.S. national phase of International Application PCT/EP2011/059424, filed Jun. 8, 2011, claiming priority to European Patent Application 10167048.7 filed Jun. 23, 2010, and the benefit under 35 U.S.C. 119(e) of U.S. Provisional Application No. 61/398,366, filed Jun. 24, 2010; the disclosures of International Application PCT/EP2011/059424, European Patent Application 10167048.7 and U.S. Provisional Application No. 61/398,366, each as filed, are incorporated herein by reference.

The present invention relates to a polyolefin composition suitable to produce pipe systems and sheets.

Pipes, tubing and fittings are intended within the term of pipe systems.

The term sheets includes sheets for thermoforming and plates to be used in the preparation of semi-finished products such as those employed in chemical industry.

The sheets or plates are mainly being used in the production of articles such as containers for housewares and food, for example juice containers, yogurt cups, margarine tubs and others. Said sheets or plates can also be used in the production of automotive parts.

The pipe systems according to the present invention are particularly suitable to transport, outdoor and indoor, fluids under high pressure and/or gravity sewerage and their handling during installation is very easy.

In pressure pipe applications polypropylene is appreciated in hot and cold water distribution systems inside and outside buildings and/or when high chemical resistance is required.

Pipes wherein the polypropylene plastic material is used in place of the currently used plastic materials are not usually used till now, due to an insufficient balance of mechanical properties, in particular insufficient balance between hydraulic pressure resistance and impact resistance of the polypropylene material, especially at low temperature.

Patent application WO 2006/002778 discloses mono or multilayer pipe systems having at least one layer comprising a semi-crystalline copolymer of propylene and hexene-1 and, optionally, a further recurring unit derived from the olefins selected from ethylene and a $C_4$-$C_{10}$ α-olefin, wherein said copolymer contains from 0.2 to 5 wt %, preferably 0.5 to 5 wt % of recurring units derived from hexene-1. Pipe systems according to the above mentioned invention show a very high hydraulic pressure resistance which provides pipes with high durability. The drawback related to said systems is low impact resistance expressed by the low values of IZOD test, particularly at low temperatures. This aspect is critical because this property is associated with workability and handling of the pipes during installation. Pipes based on materials having low impact resistance values become not workable and their handling is difficult when the temperature is lower than 10° C., that is very common during the cold seasons in most of the countries.

Patent application WO 2005/014713 discloses a heterophasic polypropylene composition suitable for non-pressure pipe applications, such as waste water pipes, for both indoor use and, preferably, outdoor use. Said composition provides pipe systems with good impact properties. However, we have found that pipe systems made from said composition have very low values of hydraulic pressure resistance, therefore said composition can not be used for pipe systems transporting fluids under high pressure for a long time.

WO 2008/077773 discloses a polymeric composition comprising (percent by weight):

1) 10-60% of a copolymer of propylene and hexene-1 wherein said copolymer comprises from 0.2 to 10% of recurring units derived from hexene-1, preferably from 0.5 to 8%, more preferably ranging from 1 to 6%; and 2) 10-85% of a propylene polymer selected from propylene homopolymer and a polymer of propylene with 0.1-10% of a α-olefin selected from ethylene, a $C_4$-$C_{10}$ α-olefin, hexene-1 excluded, and a mixture thereof, said propylene polymer being insoluble in xylene at ambient temperature in an amount over 85% and having a Polydispersity Index ranging from 3 to 20; and 3) 5-30% of a copolymer of ethylene with a $C_3$-$C_{10}$ α-olefin and optionally a diene, having an ethylene content ranging from 15 to 60% and an intrinsic viscosity value of at least 1 g/ml.

This document is completely silent about the possibility to lower the amount of component 1) under 10%.

The applicant found that it is possible to improve the stiffness of a polyolefin pipe systems containing 1-hexene and at the same time increasing the tensile stress resistance.

Thus an object of the present invention is a polyolefin composition comprising (percent by weight):

A) from 1.0% to 9.5%; preferably from 2.0% to 8.0%, more preferably from 3.0% to 7.0% of a copolymer of propylene and 1-hexene wherein said copolymer comprises from 0.1 to 5.0% of recurring units derived from 1-hexene, preferably from 0.3 to 3.0%, more preferably ranging from 0.3 to 2.0% even more preferably from 0.4 and 1.0%; and B) from 80.5% to 99.0% preferably from 82.0% to 98.0%, more preferably from 83.0% to 97.0% of a heterophasic polypropylene composition comprising:

B1) from 50.0% to 85.0% preferably from 60.0% to 82.0% even more preferably from 75.0% to 82.0% of a propylene homopolymer, said propylene polymer being insoluble in xylene at ambient temperature in an amount over 85.0% having a polydispersity Index ranging from 3 to 10; preferably from 4 to 8 and a Melt Index from 0.5 to 10 dg/min, preferably from 0.6 to 5 dg/min, even more preferably from 0.6 to 2 dg/min according to ISO method 1133;

B2) from 5.0% to 50.0% preferably from 8.0% to 40.0% even more preferably from 8.0% to 15.0% of a copolymer of ethylene and propylene having an ethylene derived units content ranging from 30.0% to 70.0%, preferably from 40.0% to 60.0%, more preferably from 45.0% to 55.0% even more preferably from 51.0% to 55.0%.

Said polymeric composition having a Melt Index (MFR) from 0.05 to 10 dg/min, preferably from 0.1 to 3 dg/min more preferably from 0.2 to 1 dg/min, according to ISO method 1133.

Said polymeric composition and the articles derived therefrom have an optimal balance of mechanical properties; they show a Flexural Modulus higher than 1500 MPa, preferably higher than 1700 MPa.

The distribution of hexene-1 in and among the polymer chains may vary. In particular it may be that its content is higher in the polymer chains having high molecular weight with respect to its content in lower molecular weight chains.

The intrinsic Viscosity was determined in tetrahydronaphthalene at 135° C.

The values of Polydispersity Index (P.I.) in component A) can range from 3 to 15, preferably from 4 to 10, even more preferably from 5 to 8.

For Polydispersity Index is intended the rheological measurement of the Molecular Weight Distribution determined as described below.

The propylene-hexene-1 copolymers used in the present invention have a stereoregularity of isotactic type of the propylenic sequences shown by high value of xylene insolubility.

Preferably the propylene-1-hexene copolymer component A) is endowed with at least one of the following features:
- a melting temperature equal to or higher than 135° C., preferably equal to or higher than 140° C., such as from 140 to 155° C.; and
- a solubility in xylene at ambient temperature (i.e. about 25° C.) lower than 12 wt %, preferably lower than 9 wt % with respect to the total weight of the propylene-hexene-1 copolymer.

The propylene-hexene-1 copolymers used in the present invention can be prepared by a polymerization in one or more polymerization steps. Such polymerization can be carried out in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used for producing the propylene-hexene-1 copolymers of the invention are capable to provide polypropylene with a value of xylene insolubility at ambient temperature greater than 90%, preferably greater than 95%.

Catalysts having the above mentioned characteristics are well known in the patent literature; particularly advantageous are the solid catalyst components used in the catalysts described in U.S. Pat. No. 4,399,054, European patents Nos. 45977 and 395083. The solid catalyst components used in said catalysts comprise, as electron-donor compounds (internal electron-donor compounds), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate, and esters of succinic acids. Among phthalic acid esters the diisobutyl phthalate is particularly preferred.

Particularly suitable internal electron donor compounds are selected from succinates disclosed in international patent application WO00/63261.

Other electron-donors particularly suitable are 1,3-diethers described in EP 361493 and EP 728769.

Representative examples of said diethers are as follows: 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane and 9,9-bis (methoxymethyl)fluorene.

The preparation of the above mentioned catalyst components is carried out according to various methods. For example, a $MgCl_2 \cdot nROH$ adduct (in particular in the form of spherical particles) wherein n is generally from 1 to 6 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in presence or absence of the electron-donor compound, after which it is separated and washed with aliquots of a hydrocarbon until all chlorine ions have disappeared. In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide. The titanium compounds, which can be used for the preparation of the solid catalyst component, are the halides and the halogen alcoholates of titanium. Titanium tetrachloride is the preferred compound.

The Al-alkyl compounds used as co-catalysts comprise the Al-trialkyls, such as Altriethyl, Al-triisobutyl, Al-tributyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio is from 1 to 1000.

The electron-donor compounds that can be used as external donors include aromatic acid esters such as alkyl benzoates and in particular silicon compounds containing at least one Si—OR bond, where R is a hydrocarbon radical. Examples of preferred silicon compounds are $(tertbutyl)_2Si(OCH_3)_2$, $(cyclopentyl)_2Si(OCH_3)_2$, $(cyclohexyl)(methyl)Si(OCH_3)_2$ and $(isopropyl)_2Si(OCH_3)_2$.

Prior to the polymerization process, the catalysts can be precontacted with small quantities of olefins (prepolymerization), thus improving the performance of the catalysts and the morphology of the polymers prepolymerization is carried out maintaining the catalysts in suspension in a hydrocarbon solvent (hexane or heptane, for example) and polymerizing at a temperature from ambient to 60° C. for sufficient time to produce quantities of polymer from 0.5 to 3 times the weight of the solid catalyst component. It can also be carried out in liquid propylene, at the temperature conditions indicated above, producing quantities of polymer that can reach up to 1000 g per g of catalyst component. In particular, even if many other combinations of the previously said catalyst components may allow to obtain propylene-hexene-1 copolymer compositions according to the present invention, the copolymers are preferably prepared by using catalysts containing a phthalate as inside donor and $(cyclopentyl)_2Si(OCH_3)_2$ as outside donor.

Said propylene-hexene-1 copolymers are typically produced by a well-known polymerization process, such as in liquid (bulk or slurry) or in gas phase. According to the preferred polymerization process such copolymers are produced by a gas-phase polymerization process carried out in at least two interconnected polymerization zones.

The process according to the preferred process is illustrated in EP application 782 587.

In detail, said process comprises feeding the monomers to said polymerization zones in the presence of catalyst under reaction conditions and collecting the polymer product from said polymerization zones. In said process the growing polymer particles flow upward through one (first) of said polymerization zones (riser) under fast fluidization conditions, leave the riser and enter another (second) polymerization zone (downcomer) through which they flow downward in a densified form under the action of gravity, leave the downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerization zones and by the head loss introduced into the system.

Generally, the condition of fast fluidization in the riser is established by feeding a gas mixture comprising the relevant monomers to said riser. It is preferable that the feeding of the gas mixture is effected below the point of reintroduction of the polymer into said riser by the use, where appropriate, of gas distributor means. The velocity of gas transport into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The polymer circulating between the two polymerization zones can be controlled by dosing the amount of polymer leaving the downcomer using means suitable for controlling the flow of solids, such as mechanical valves.

The operating parameters, such as the temperature, are those that are usual in olefin polymerization process, for example between 50 to 120° C.

This first stage process can be carried out under operating pressures of between 0.5 and 10 MPa, preferably between 1.5 to 6 MPa.

Advantageously, one or more inert gases are maintained in the polymerization zones, in such quantities that the sum of the partial pressure of the inert gases is preferably between 5 and 80% of the total pressure of the gases. The inert gas can be nitrogen or propane, for example.

The various catalysts are fed into the riser at any point of said riser. However, they can also be fed at any point of the downcomer.

The stereoregularity of propylene polymer (B1) is of the isotactic type, as shown by high values of xylene insolubility. In particular, the propylene polymer (B1) is preferably insoluble in xylene at ambient temperature in an amount over 90 wt %, more preferably over 95 wt %.

The propylene polymer (B1) can be obtained by polymerizing the monomers in the presence of Ziegler-Natta catalysts as described above for the component (A).

The ethylene copolymer (B2) can comprise a diene, conjugated or not, such as butadiene, 1,4-hexadiene, 1,5-hexadiene and ethylidene-norbornene-1. The diene, when present, is typically in an amount of from 0.5 to 10 wt % with respect to the total weight of the ethylene copolymer (B2). Said ethylene copolymer (B2) can be obtained by polymerizing the monomers in the presence of Ziegler-Natta catalysts as described above for the components (A) and (B1).

The polymeric composition of the present invention can be obtained by blending the components (A), (B1) and (B2) or by a sequential polymerization process. In the sequential polymerization process the order of the polymerization stages is not a critical process feature, however it is preferred to prepare polymers with higher xylene insolubility, such as components (A) and (B1), before preparing the ethylene copolymer (B2).

According to a preferred embodiment the composition of the present invention can be obtained by combining the component (A) with the heterophasic composition (B)

The process for preparing the heterophasic polyolefin composition (B) is carried out by a sequential polymerization comprising at least two sequential steps, wherein components (B1) and (B2) are prepared in separate subsequent steps, operating in each step, except the first step, in the presence of the polymer formed and the catalyst used in the preceding step. Preferably the catalyst is added only in the first step, however its activity is such that it is still active for all the subsequent steps. Component (B1) is preferably prepared in a single polymerization stage.

The order of the polymerization stages is not a critical process feature; however component (B1) is preferably prepared before component (B2). The polymerization can occur in liquid phase, gas phase or liquid-gas phase. For example, it is possible to carry out the propylene polymerization stage using liquid propylene as diluent, and the following copolymerization stage in gas phase, without intermediate stages except for the partial degassing of the propylene. Examples of suitable reactors are continuously operated stirred reactors, loop reactors, fluidized-bed reactors or horizontally or vertically stirred powder bed reactors. Of course, the reaction can also be carried out in a plurality of reactors connected in series.

It is possible to carry out the polymerization in a cascade of stirred gas-phase reactors that are connected in series and in which the pulverulent reaction bed is kept in motion by means of a vertical stirrer. The reaction bed generally comprises the polymer that is polymerised in the respective reactor.

Reaction time, pressure and temperature relative to the polymerization steps are not critical, however it is better if the temperature is from 20 to 150° C., in particular from 50 to 100° C. The pressure can be atmospheric or higher.

The regulation of the molecular weight is carried out by using known regulators, hydrogen in particular.

Alternatively, the heterophasic polyolefin composition (B) can be produced by the gas-phase polymerization process carried out in at least two interconnected polymerisation zones and described in detail above.

The polymeric composition of the invention can further comprise an inorganic filler agent in an amount ranging from 0.5 to 60 parts by weight with respect to 100 parts by weight of said polymeric composition. Few examples of such filler agents are calcium carbonate, barium sulphate, titanium bioxide and talc. Talc and calcium carbonate are preferred. A number of filler agents can also have a nucleating effect, such as talc that is also a nucleating agent. The amount of a nucleating agent is typically from 0.5 to 5 wt % with respect to the polymer amount.

Pipe systems and sheets according to the present invention may be single layer or multilayer, wherein the layers can have the same or different thickness. Typically the thickness of the sheets may vary between 0.25 mm and 10 mm, preferably between 0.3 mm and 7 mm. In multilayer pipes, all the layers can be made from the same polyolefin composition. Otherwise, at least one layer is made from the polyolefin composition described above and the further layer(s) are made from amorphous or crystalline polymers of R—CH=CH$_2$, where R radical is a hydrogen or a C$_1$-C$_6$ alkyl radical, or their mixtures, or fluorinated polymers, such as polyvinyl difluoride. Examples of said polymers are isotactic or mainly isotactic propylene homopolymers, polyethylene, polyolefin copolymers or further heterophasic polyolefin compositions.

Pipe systems and sheets according to the invention are produced in manner known per se, such as by extrusion or injection moulding of the polyolefin composition. Multilayer pipes are produced by coextrusion or other methods as well.

Extrusion of articles can be made with different type of extruders for polyolefin, e.g. single or twin screw extruders.

With the polymeric composition according to the present invention it is possible to achieve a material having high flexural modulus and at the same time high creep resistance. This is due to the particular balancement of the features of component A) such as the amount of 1-hexene derived units, the polydispersity and the amount of the component itself and the balancement of features of the heterophasic composition B) such as the amount of B1 and B2 used and the amount of ethylene units in component B2)

The following examples are given to illustrate the present invention without limiting purpose.

The data relating to the pipe systems and sheets of the examples are determined by way of the methods reported below. Results of the tests are shown in Table 1.

Xylene Soluble Fraction: Determined as follows.

2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

Polydispersity Index: Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/G_c$$

in which $G_c$ is the crossover modulus defined as the value (expressed in Pa) at which $G'=G''$ wherein $G'$ is the storage modulus and $G''$ is the loss modulus.

Melt Flow Rate (MFR): According to ISO method 1133 (5 Kg, 230° C.)

Content of 1-hexene: Determined by I.R. spectroscopy

The infrared spectrum of a pressed film of the polymer is recorded in absorbance vs. wavenumbers (cm$^{-1}$). The area of the combination band between 4482 and 3950 cm$^{-1}$ is used for spectrometric normalization of film thickness. A Partial Least Squares (PLS) calibration is applied to the range 790-760 cm−1 in order to determine ethylene and hexene % by weight.

Content of ethylene: Determined by I.R. spectroscopy

The infrared spectrum of a pressed film of the polymer is recorded in absorbance vs. wavenumbers (cm$^{-1}$). The area of the combination band between 4482 and 3950 cm$^{-1}$ is used for spectrometric normalization of film thickness. A Partial Least Squares (PLS) calibration is applied to the range 790-760 cm−1 in order to determine ethylene and hexene % by weight.

Hydraulic Pressure Resistance: According to ISO method 1167-1, tests were carried out at temperature of 80° C. and under a circumferential stress of 4.2 MPa.

Flexural elastic modulus: According to ISO method 178.

Component A

The component (A) was prepared according to the process disclosed in example 1 of the patent application EP10150735.8, by varying the amount of 1-hexene added so that to obtain a copolymer of propylene and hexene-1 having a content of hexene-1 derived units of 0.4% by weight. The data of the copolymer are reported on table 1.

TABLE 1

| | |
|---|---|
| Hexene-1 Content, wt % | 0.4 |
| Polidispersity Index | 4.2 |
| Xylene-Soluble Content, wt % | 1.3 |

Component B)

Preparation of the Solid Catalyst Component

Into a 500 mL four-necked round flask, purged with nitrogen, 250 ml of TiCl$_4$ are introduced at 0° C. While stirring, 10.0 g of microspheroidal MgCl$_2$.1.8C$_2$H$_5$OH (prepared according to the method described in ex. 2 of U.S. Pat. No. 4,399,054 but operating at 3000 rpm instead of 10000 rpm) and 9.1 mmol of diethyl 2,3-(diisopropyl)succinate are added. The temperature is raised to 100° C. and maintained for 120 min. Then, the stirring is discontinued, the solid product was allowed to settle and the supernatant liquid is siphoned off. Then the following operations are repeated twice: 250 ml of fresh TiCl$_4$ are added, the mixture is reacted at 120° C. for 60 min and the supernatant liquid is siphoned off. The solid is washed six times with anhydrous hexane (6×100 mL) at 60° C.

Polymerization

The catalyst system was formed by the catalyst component prepared as described above, triethylaluminium (TEAL) as co-catalyst and dicyclopentyldimethoxysilane as external donor, with the weight ratios indicated in the following Tables.

The propylene polymer compositions of the examples were prepared in a two-step polymerization process, wherein the homopolymer A) was prepared in the first polymerization step by feeding the monomers and the catalyst system into a gas-phase polymerization reactor comprising two interconnected polymerization zones, a riser and a downcomer, as described in the European Patent EP-A1-782587. The polymerization mixture was discharged from said reactor, conveyed to a gas-solid separator and the polymerized material was sent into a conventional gas-phase fluidized-bed reactor where the copolymer B) was produced. The operative conditions are indicated in the Table 2.

The polymer particles exiting from the second polymerization step were subjected to a steam treatment to remove the unreacted monomers and dried. The characteristics of the obtained polymer are reported on table 3

TABLE 2

| Component B | | 1 |
|---|---|---|
| Component B1 | | |
| TEAL/external donor | wt/wt | 4 |
| TEAL/catalyst | wt/wt | 5 |
| Temperature | ° C. | 80 |
| Pressure | barg | 27 |
| Split holdup | | |
| riser | wt % | 40 |
| downcomer | wt % | 60 |
| H2/C3 riser/downer | mol/mol | 0.003 |
| Tm | ° C. | 163 |
| Component B2 | | |
| Temperature | ° C. | 80 |
| Pressure | MPa | 1.7 |
| C2/C2 + C3 | | 0.43 |
| H2/C2 | | 0.009 |

C2 = ethylene; C3 = propylene; C6 = 1-hexene; H2 = hydrogen

TABLE 3

|  | | Component B |
|---|---|---|
| Component B1 | | |
| MFR (melt index) | g/10' | 1.1 |
| Polydispersity | | 4.3 |
| Xylene soluble | % | 1.8 |
| Component B2 | | |
| Ethylene content | Wt % | 51 |
| Split | % | 10 |
| Component B (total) | | |
| Ethylene content | Wt % | 5.1 |
| MFR | g/10' | 1.1 |
| Xylene soluble | % | 12 |
| IV XS | dl/g | 4 |

Component A and component B have been added with the additives indicated in table 4. in table 4 comparative example 1 is 100% component B example 1 according to the invention is 5% of component A and 95% component B while comparative example 2 is 10% of component A and 90% of component B.

TABLE 4

| Example | | Comp 1 | 1 | Comp 2 |
|---|---|---|---|---|
| Formulation | | | | |
| DSTDP | % | 0.33 | 0.33 | 0.33 |
| TALCO | % | 1.0 | 1.0 | 1.0 |
| Component A | % | — | 5 | 10 |
| CA STEARATE - M | % | 0.05 | 0.05 | 0.05 |
| IRGAFOS 168 | % | 0.11 | 0.11 | 0.11 |
| IRGANOX 1010 | % | 0.2 | 0.2 | 0.2 |
| IRGANOX 1330 | % | 0.11 | 0.11 | 0.11 |
| Characterization | | | | |
| MFR 5 Kg | g/10' | 1.3 | 1.3 | 1.3 |
| Index Yellow | nr. | 2.7 | 2.7 | 3.3 |
| XS | % | 9.3 | 8.9 | 8.7 |
| Flexural Modulus 24 h | MPa | 1810 | 1850 | 1775 |
| Flexural Modulus 7 Day | MPa | 1985 | 2030 | 1908 |
| Tens. Str. @ break 24 h | MPa | 29.8 | 29.3 | 29.5 |
| DBTT 24 h | ° C. | −33.7 | −30.2 | −20.7 |
| ||Tm | ° C. | 163.9 | 163.5 | 162.7 |

From table 4 it clearly results that the composition of example 1 according to the invention shows a flexural modulus higher than the comparative example 1 wherein component B is used and comparative example 2 wherein 10% of compound B is used. Furthermore Index yellow, and flexural modulus are increased.

Pipes of the material of example 1 and comparative example 1 were obtained. Said extruded pipe has nominal diameter of 32 mm and wall thickness of 2.9 mm. Hydraulic pressure resistance at 80° C. and 4.2 MPa of said pipes were measured.

|  | | Comp example 1 | Example 1 |
|---|---|---|---|
| hydraulic pressure resistance | hours | 497 | 2249 |

In table 5 it is shown that even by adding a small amount of component A) the hydraulic pressure resistance is considerably increased.

The invention claimed is:

1. A polyolefin composition comprising (percent by weight):
    A) from 1.0% to 9.5%; of a copolymer of propylene and 1-hexene wherein said copolymer comprises from 0.1 to 5% of recurring units derived from 1-hexene; and
    B) from 80.5% to 99% of a heterophasic polypropylene composition comprising:
        B1) from 50% to 85% of a propylene homopolymer, said propylene polymer being insoluble in xylene at ambient temperature in an amount over 85% having a polydispersity Index ranging from 3 to 10; and a Melt Index from 0.5 to 10 dg/min; and
        B2) from 5% to 50% of a copolymer of ethylene and propylene having an ethylene derived units content ranging from 30% to 70%;
    said polymeric composition having a Melt Index from 0.05 to 10 dg/min.

2. The polyolefin composition according to claim 1 having a Flexural Modulus higher than 1500 MPa.

3. The polyolefin composition according to claim 1 comprising (percent by weight):
    A) 2% to 8%, of the copolymer of propylene and 1-hexene; and
    B) from 82% to 98%, of the heterophasic polypropylene.

4. The polyolefin composition according to claim 1 wherein the propylenen/hexane-1 component A contains from 0.3 to 3% recurring units derived from hexene-1.

5. The polyolefin composition according to claim 1 wherein the heterophasic propylene composition component B comprises:
    B1) from 60% to 82% of the propylene homopolymer described in claim 1; and
    B2) from 8% to 40% of a copolymer of ethylene and propylene having an ethylene derived units content ranging from 40% to 60%.

6. Pipe systems and sheets comprising a polyolefin composition according to claim 1.

7. Mono- or multilayer pipes and sheets wherein at least one layer comprises the polyolefin composition according to claim 1.

* * * * *